United States Patent
Ahmed

(10) Patent No.: US 7,616,348 B2
(45) Date of Patent: Nov. 10, 2009

(54) METHOD AND APPARATUS FOR ENHANCING SCANNED DOCUMENTS

(75) Inventor: Mohamed Nooman Ahmed, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 510 days.

(21) Appl. No.: 11/317,610

(22) Filed: Dec. 23, 2005

(65) Prior Publication Data

US 2007/0146807 A1     Jun. 28, 2007

(51) Int. Cl.
*H04N 1/40* (2006.01)
(52) U.S. Cl. .............. 358/3.22; 358/426.12; 358/474; 382/168; 382/173; 382/170
(58) Field of Classification Search .......... 358/1.9, 358/2.1, 3.26, 3.27, 462–464, 466, 532; 382/132, 382/165, 168, 170, 176, 128, 167, 171, 172, 382/177, 254, 274–275, 169; 702/20
See application file for complete search history.

(56) References Cited

U.S. PATENT DOCUMENTS

| | | | |
|---|---|---|---|
| 6,240,215 B1 * | 5/2001 | Salgado et al. | 382/254 |
| 6,647,144 B2 * | 11/2003 | Williams et al. | 382/173 |
| 6,987,879 B1 * | 1/2006 | Suino | 382/165 |
| 7,058,222 B2 * | 6/2006 | Li et al. | 382/170 |
| 7,064,863 B2 * | 6/2006 | Fukuda et al. | 358/1.9 |
| 7,162,101 B2 * | 1/2007 | Itokawa et al. | 382/282 |
| 7,206,104 B2 * | 4/2007 | Lee | 358/488 |
| 7,209,599 B2 * | 4/2007 | Simske et al. | 382/275 |
| 7,391,540 B2 * | 6/2008 | Chen | 358/474 |
| 2001/0055426 A1 * | 12/2001 | Yamazaki | 382/199 |

* cited by examiner

*Primary Examiner*—Mark K Zimmerman
*Assistant Examiner*—Dung D Tran
(74) *Attorney, Agent, or Firm*—Michael Best & Friedrich

(57) ABSTRACT

A method, and a system employing the method, of enhancing an intensity of an image of a multi-page or multi-portion document is disclosed. The method includes determining a first background parameter from a first section of a scanned page and stretching data corresponding to the scanned page based on the first background parameter. The method also includes determining a second background parameter from data of a second section of the scanned page and stretching data corresponding to another scanned page based on the second background parameter.

20 Claims, 2 Drawing Sheets

METHOD AND APPARATUS FOR ENHANCING SCANNED DOCUMENTS

BACKGROUND

Embodiments of the invention relate to systems and methods for enhancing scanned images acquired or generated using a conventional scanner or a multifunction device ("MFD") capable of any combination of scanning, faxing, copying, or printing functions.

Many scanning systems scan documents and create scanned images of the documents using a variety of processes. An exemplary process is an automatic background detection process that extracts background information from the document. The background information is used for a variety of purposes. For example, the scanning systems can use the automatic background detection process to determine pixel values of the scanned images of the document and to identify a pixel as background if the pixel value satisfies some pre-determined criteria. In other cases, the automatic background detection process determines the pixel values from pixels in a region such as a leading edge of the scanned images of the document.

After the background pixels have been identified, the scanning systems generally use other processes to categorize or analyze characteristics of the background and to alter the characteristics of the background. For example, scanning systems may generate histograms or frequency distribution charts based on the values of the background pixels and determine some statistics of the pixel values. The statistics can include a peak value, a medium value, a mean value, and a standard deviation. Using the histograms and the statistics, the scanning systems can identify or estimate an intensity level of the background and a gain factor that can be used to compensate for a background gray level of the document.

SUMMARY

The automatic background detection process of the prior art generally assumes the background throughout the document is consistent. As such, the automatic background detection process produces reasonable background information if the background information is relatively consistent throughout the document. However, the automatic background detection process fails to produce accurate background information if the background information is relatively inconsistent throughout the document. As an example, if the top edge of a page of the document has a very dark intensity such as in a dark photograph while the remainder of the document has a much lighter background, the automatic background detection process may fail to produce accurate background information for the document.

Embodiments of the invention therefore track changes in background throughout the document. In one form, the invention provides a method of enhancing a multi-page image represented by computer readable data. The method includes determining a background parameter from data of a first section of a scanned page and stretching data corresponding to the scanned page based on the background parameter. The method also includes determining a second background parameter from data of a second section of the scanned page and stretching data corresponding to another scanned page based on the second background parameter.

In another form, the invention provides a system for enhancing a multi-page image represented by computer readable data. The system includes a background estimating module that determines a background parameter from data of a section of the scanned page and a second background parameter from data of a second section of the scanned page. The system includes a data stretching module that stretches data corresponding to the scanned page based on the background parameter and that stretches data corresponding to another page based on the second background parameter.

In yet another form, the invention provides a method of enhancing an image represented by computer readable data. The method includes determining a background parameter from data of a first section of a first portion of the image and stretching data corresponding to the first portion based on the background parameter. The method also includes the acts of determining a second background parameter from data of a second section of the first portion and stretching data corresponding to the second portion of the image based on the second background parameter.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the system shown in the figure is a model of what an actual system might be like. As noted, many of the modules and logical structures described are capable of being implemented in software executed by a microprocessor or a similar device or of being implemented in hardware using a variety of components including, for example, application specific integrated circuits ("ASICs"). Terms like "controller" may include or refer to hardware, firmware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, the claims should not be limited to the specific examples or terminology or to any specific hardware, firmware or software implementation or combination thereof.

Embodiments of the invention relate to a method and a system employing the method, for enhancing a background of a scanned document. In one embodiment, the system considers background parameters from a section of a first page. The system enhances the background of the first page based on the background parameters while simultaneously considering the background parameters from a second section of the first page. Thereafter, the system enhances the background of another page of the document based on the background parameters from the first and second sections of the first page. Though reference is made to the first and second pages of the document, no order of the pages is necessarily intended. Moreover, the term "pages" can also refer to paragraphs, portions, or other terms used to define various sections of the scanned document or of the data representing the scanned document.

Figure 1:
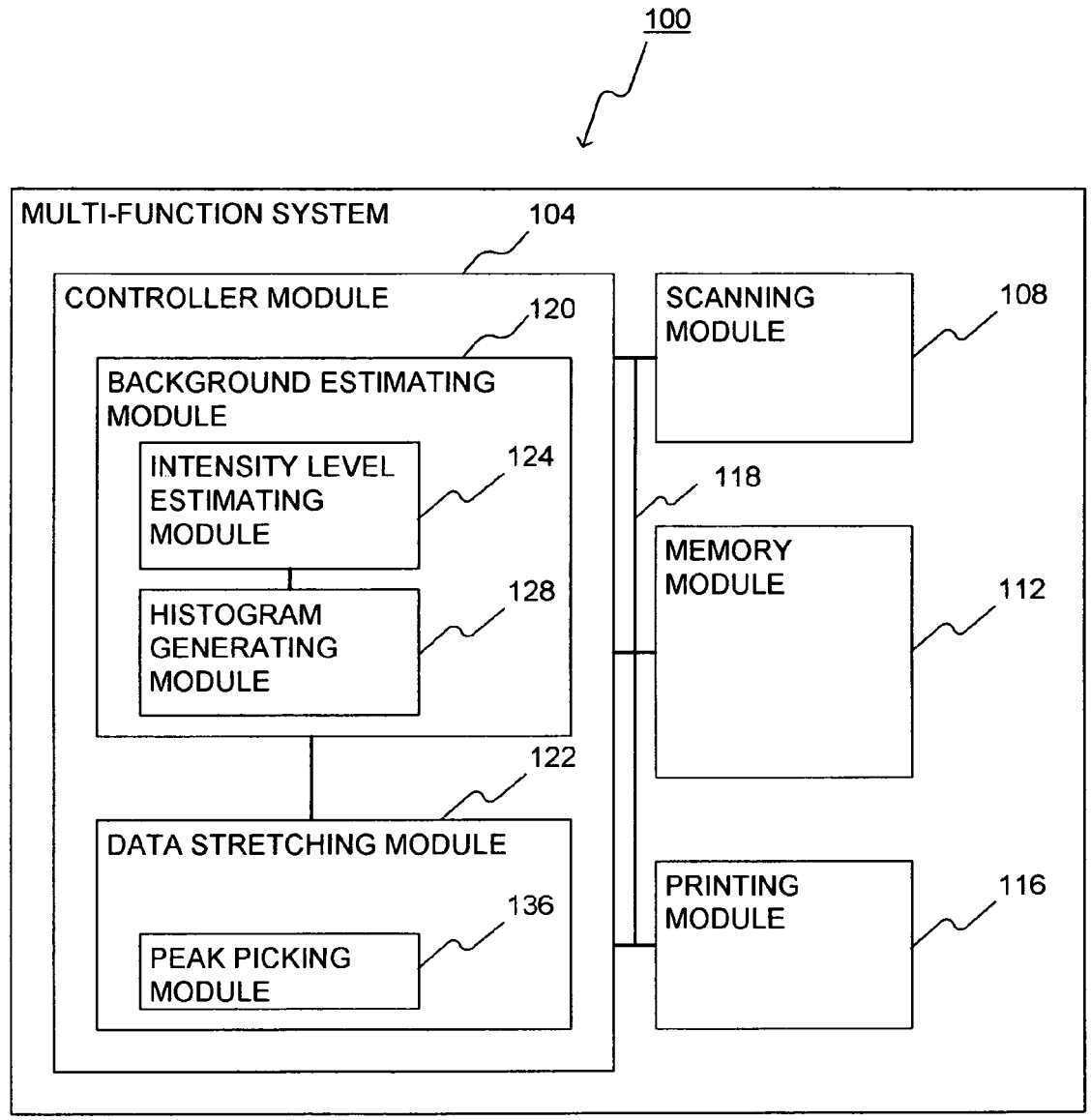
FIG. 1 shows an exemplary system block diagram of an embodiment of a multi-function system.

FIG. 1 shows an exemplary system 100 embodying the invention in the form of, but not limited to, a multi-function device ("MFD") that is capable of performing any combination of scanning, faxing, copying, or printing functions, and that includes components that may be implemented in any combination of software, firmware, and hardware. For example, some of the components shown in the system 100 can be portions of a software program that is executed in a connected computing system such as a laptop, while other components can be portions of some hardware devices such as an ASIC. The system 100 includes a controller module or a controller 104, a scanning module 108, a memory module or a memory 112, and a printing module 116. In some embodiments, any number of the components including the scanning module 108, the memory 112, and the printing module 116 can be integrated into the controller 104. In some embodiments, the controller 104 communicates with the scanning module 108, the memory 112, and the printing module 116 via a bus 118. In some other embodiments, the scanning module 108 is external to the system 100. In such cases, the system 100 can obtain data from input devices, such as a standalone scanner or another MFD, (not shown) or through an input interface, such as a printer or network display, (not shown) coupled to the system 100 in a known manner. Similarly, in yet some other embodiments, the printing module 116 is external to the system 100. In such cases, the system 100 can output data with output devices (not shown) or through an output interface (not shown) coupled to the system 100 in a known manner.

The controller 104 also includes a background estimating module 120 and a data stretching module 122. The background estimating module 120 is configured to estimate background information or parameters such as intensity levels from the data that is stored in the memory 112. In the embodiment shown in FIG. 1, the background estimating module 120 includes an intensity level estimating module 124 and a histogram generating module 128. Furthermore, the data stretching module 122 includes a peak picker module or peak picker 136 that can pick a peak or a maximum value from a set of data values. Alternatively, the background estimating module 120 can be configured to estimate other background information such as color and luminance from the data.

Furthermore, although the background estimating module 120 and the data stretching module 122 are shown as part of the system 100, parts of the system 100 such as the background estimating module 120 and the data stretching module 122 can also be portions of a software program residing in a connected computer that executes the software program and that communicates with the system 100.

After a required portion of an image has been scanned by the scanning module 108 and stored in the memory 112, or when data of scanned images are made available in the memory 112 or to the controller 104, the background estimating module 120 starts to estimate or obtain background parameters from the data. The scanned images are stored in the form of pixels. Each of the pixels has a plurality of values or pixel values. Furthermore, each of the pixel values may be categorized. The scanned images may also include background pixels that are characterized by parameters such as intensity levels of the values of the pixels that are considered background. Still furthermore, the scanned images can come from the same document such as a book. However, the scanned images can also come from different documents such as forms.

The background estimating module 120 first selects a strip or a region of data or pixels from a first page of the scanned images. The region is generally chosen at a leading edge of the first page. However, other regions of the first page can also be selected. The region of pixels has M scan lines near the leading edge of the first page, and each of the scan lines has a width of W. For example, in some embodiments, the value of M is 64. The intensity level estimating module 124 then estimates or determines a plurality of intensity levels f(i,j) of the pixels within the region of pixels, where i,j are the coordinates of a pixel. Once the intensity levels f(i,j) of the pixels within the region of pixels have been obtained and assuming that G is the range of intensity levels of any pixels, the histogram generating module 128 generates a first frequency distribution or a first histogram, $H_1$, based on the determined intensity levels as shown in EQN. (1).

$$H_1 = \sum_{i=1}^{M} \sum_{j=1}^{W} [f(i, j) = l] \; 0 \leq l \leq G - 1 \qquad \text{EQN. (1)}$$

In some embodiments, the range of intensity levels, G, has a value of 256. Although the data of the first and second pages are shown received or stored in the memory 112 simultaneously, the data of the first page can also be received or stored in the memory 112, and then followed by receiving the data of the second page at the memory 112 or at the controller 104 as needed, or after the data of the first page has been processed.

The peak picker 136 then calculates a gray level at which the first histogram is maximum (peak), $P_1$ shown in EQN. (2).

$$P_1 = \min\{g | H_1(g) > H_1(i) \forall i > T\} \qquad \text{EQN. (2)}$$

In EQN. (2), T is a predetermined threshold of intensity level. For example, in some embodiments, the value of T is about 180. Particularly, EQN. (2) determines a minimum intensity of the first histogram, $H_1$, of the region such that the histogram frequency corresponding to the minimum intensity of the region is greater than the histogram frequency corresponding to the predetermined threshold of intensity level. In this way, the chances of selecting a dark document on a dark background are minimized. Although one form of peak picking is described in EQN. (2), other peak picking algorithms can also be used. Furthermore, although the peak picker 136 is shown as a part of the data stretching module 122 in FIG. 1, the peak picker 136 can also be a stand-alone module or a module integral with the background estimating module 120.

Thereafter, the controller 104 simultaneously starts the histogram generating module 128, (which generates a second histogram, $H_2$, of the entire first page that has a length of L) and the peak picker 136 (which determines a second peak). The algorithm for generating the second histogram is shown in EQN. (3).

$$H_2 = \sum_{i=1}^{L} \sum_{j=1}^{W} [f(i,j) = l] \; 0 \le l \le G-1 \qquad \text{EQN. (3)}$$

Similar to the peak picking described earlier, a second gray level at which the second histogram, $H_2$, of the entire first page is maximum (peak), $P_2$, is also determined in the peak picker 136 as shown in EQN. (4).

$$P_2 = \min\{g | H_2(g) > H_2(i) \forall i > T\} \qquad \text{EQN. (4)}$$

In EQN. (4), T is the predetermined threshold of intensity level having an exemplary value of about 180. EQN. (4) therefore determines the maximum peak, or a second minimum intensity of the second histogram, $H_2$, of the entire first page such that the histogram frequency corresponding to the second minimum intensity of the entire first page is greater than the histogram frequency corresponding to the predetermined threshold of intensity level.

Once the maximum (peak) value, $P_1$ has been determined, the pixels of the first page are then corrected by the data stretching module 122. Particularly, the intensity level f(i,j) of each of the pixels in the entire first page is proportionally adjusted, corrected, or stretched as shown in EQN. (5), where i,j are the coordinates of a pixel in the entire first page.

$$k(i,j) = \begin{cases} G & \text{if } f(i,j) \ge P_1 \\ \dfrac{G \cdot f(i,j)}{P_1} & \text{else} \end{cases} \qquad \text{EQN. (5)}$$

In EQN. (5), k(i,j) is the adjusted, corrected, or stretched intensity level of a pixel whose coordinates are (i,j). The adjusted intensity levels can then be further processed by other processes in the controller 104, or by the system 100, and output at the optional printing module 116.

Referring back to EQN. (3) and EQN. (4), the second histogram, $H_2$, and the second peak, $P_2$ are generally more accurate than the first histogram $H_1$ and the first peak, $P_1$ in describing the background information of the first page. Thus, applying a second histogram, $H_2$, and a second peak, $P_2$, to another similarly scanned page, or to another page of the scanned document may be more accurate. This may be particularly true when the data stretching module 122 uses the second peak level, $P_2$ to adjust, correct, or stretch the pixels of a second page that can include another page, or a remaining page of the document as shown in EQN. (6).

$$v(i,j) = \begin{cases} G & \text{if } f(i,j) \ge P_2 \\ \dfrac{G \cdot f(i,j)}{P_2} & \text{else} \end{cases} \qquad \text{EQN. (6)}$$

In EQN. (6), v(i,j) is the adjusted, corrected or stretched intensity level of the pixel of the second page whose coordinates are (i,j). In some embodiments, the processes such as estimating the intensity levels, obtaining a histogram of the intensity levels and picking a peak from the histogram can be repeated for the second page. The peak obtained can then be applied to yet another page.

Figure 2:
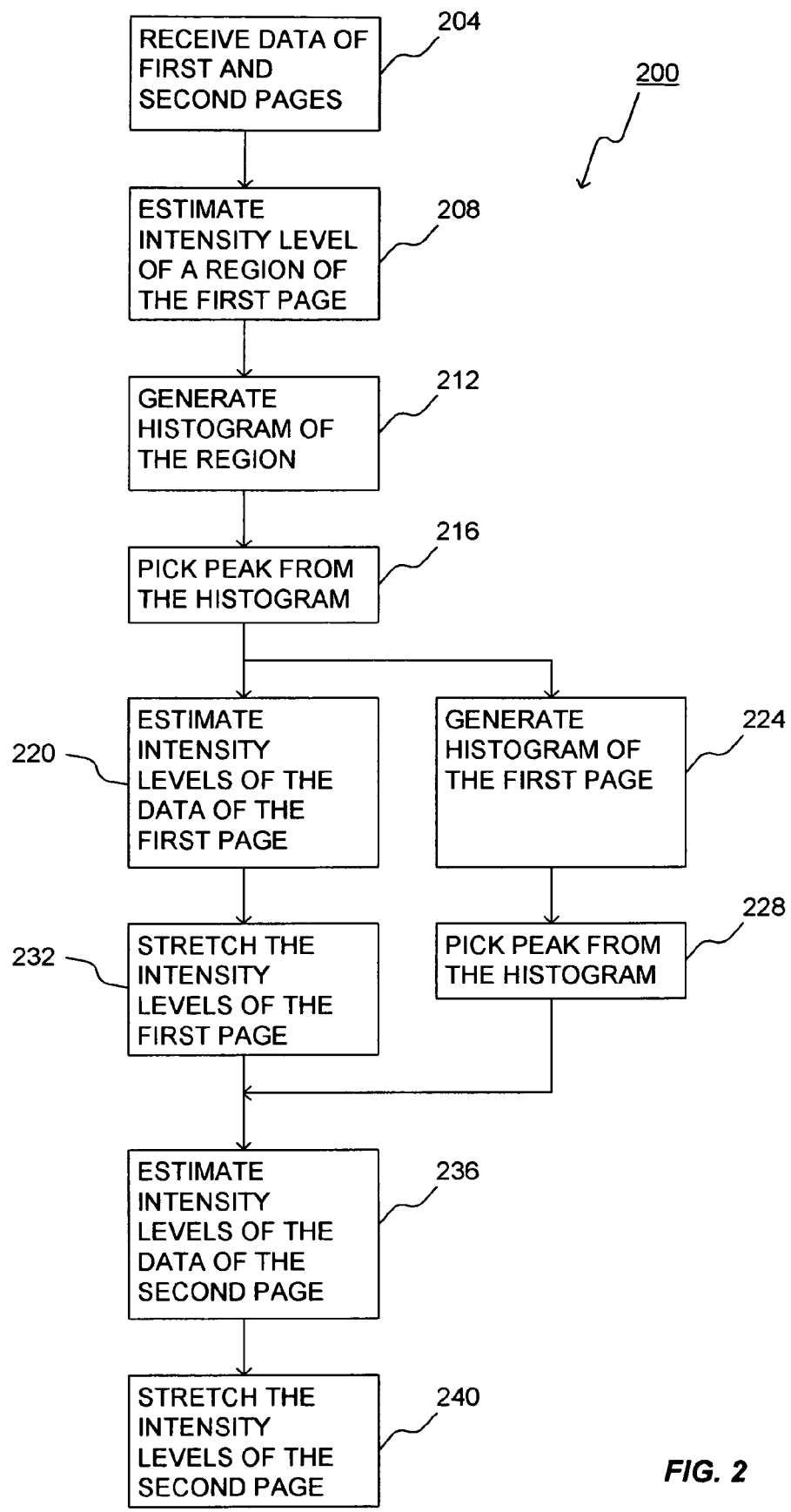
FIG. 2 shows a flow chart that illustrates processes that occur in some embodiments of the present invention.

FIG. 2 includes a flow chart of an intensity enhancement method or process 200 that further illustrates processes that occur in some embodiments, including processes that may be carried out by software, firmware, and/or hardware. At block 204, the data of a region of the first page in the form of pixel values is received. The background parameters, such as the intensity levels of the pixels of the region of the first page are then obtained at block 208, and a first histogram is also obtained from the intensity levels at block 212, as described earlier with EQN. (1). The peak intensity level of the background as described with EQN. (2) is then obtained or determined at block 216.

While the intensity enhancement process 200 estimates the intensity levels from the data of the entire first page at block 220, the intensity enhancement process 200 can simultaneously generate a second histogram from the data of the entire first page as described with EQN. (3) at block 224 and pick a second peak from the second histogram as described with EQN. (4) at block 228. The intensity enhancement process 200 then stretches the data of the entire first page as described with EQN. (5) at block 232. Once the second peak has been determined at block 228, the intensity levels of the data of a second page are estimated or determined at block 236. The intensity levels of the second page are then adjusted or corrected as described with EQN. (6) at block 240. The intensity enhancement process 200 can then be repeated for subsequent pages.

Thus, the invention provides, among other things, an intensity enhancement process and a system employing the intensity enhancement method or process. Various features and advantages of the invention are set forth in the following claims.

The invention claimed is:

1. A method of enhancing a multi-page image represented by computer readable data, the method comprising:
   determining a first background parameter from data of a first section of a scanned page;
   stretching data corresponding to the scanned page based on the first background parameter;
   determining a second background parameter from data of a second section of the scanned page; and
   stretching data corresponding to another scanned page based on the second background parameter.

2. The method of claim 1, wherein the first background parameter comprises intensity levels of the first section of the scanned image, and wherein the act of determining the first background parameter from the data of the first section of the scanned page further comprises:
   determining intensity levels of the data of the first section of the scanned page; and
   generating a histogram of the intensity levels.

3. The method of claim 2, wherein the act of stretching the data corresponding to the scanned page based on the first background parameter further comprises:
   determining a maximum value of the intensity levels compared against a threshold; and
   proportionally adjusting the intensity levels of the scanned page based on the maximum value.

4. The method of claim 1, wherein the second background parameter comprises intensity levels and wherein the act of determining the second background parameter from the data of the second section of the scanned page further comprises determining the intensity levels of the data of the second section of the scanned page.

5. The method of claim 4, further comprising generating a second histogram of the intensity levels.

6. The method of claim 4, wherein the act of stretching the data corresponding to the other scanned page based on the second background parameter further comprises:

determining a maximum value of the intensity levels compared against a threshold; and proportionally adjusting the intensity levels of the other scanned page based on the maximum value.

7. The method of claim 1, wherein the scanned pages are from a document.

8. The method of claim 1, wherein the acts of stretching data corresponding to the scanned page based on the first background parameter and determining the second background parameter from the data of the second section of the scanned page further comprise simultaneously starting stretching the data corresponding to the scanned page based on the first background parameter and determining the second background parameter from the data of the second section of the scanned page.

9. A system for enhancing a multi-page image represented by computer readable data, the system, comprising:

a background estimating module configured to determine a first background parameter from data of a section of a scanned page, and to determine a second background parameter from data of a second section of the scanned page; and a data stretching module configured to stretch data corresponding to the scanned page based on the first background parameter, and to stretch data corresponding to another scanned page based on the second background parameter.

10. The system of claim 9, wherein the first background parameter comprises intensity levels of the section of the scanned page and wherein the background estimating module comprises an intensity level estimating module configured to determine the intensity levels of the data of the section of the scanned page, and a histogram generating module configured to generate a histogram of the intensity levels.

11. The system of claim 10, wherein the intensity levels comprise a first set of intensity levels, wherein the background estimating module is further configured to determine a second set of intensity levels of the data corresponding to the second section of the scanned page, wherein the data stretching module comprises a peak picker configured to determine a maximum value of the first set of the intensity levels, and wherein the data stretching module is further configured to proportionally adjust the second set of intensity levels with the maximum value.

12. The system of claim 9, wherein the second background parameter comprises intensity levels and wherein the background estimating module comprises an intensity level estimating module configured to determine the intensity levels of the data of the second section of the scanned page, and a histogram generating module configured to generate a second histogram of the intensity levels.

13. The system of claim 12, wherein the intensity levels comprise a second set of intensity levels, wherein the background estimating module is further configured to determine a third set of intensity levels of the data corresponding to another scanned page, and wherein the data stretching module comprises a peak picker configured to determine a maximum value of the second set of the intensity levels, and wherein the data stretching module is further configured to proportionally adjust the third set of intensity levels with the maximum value.

14. The system of claim 9, further comprising a controller configured to simultaneously start the background estimating module to determine the second background parameter from the data of the second section of the scanned page and the data stretching module to stretch the data corresponding to the other scanned page based on the second background parameter.

15. A method of enhancing an image represented by computer readable data, comprising:

determining a first background parameter from data of a first section of a first portion of the image;

stretching data corresponding to the first portion based on the first background parameter;

determining a second background parameter from data of a second section of the first portion; and stretching data corresponding to a second portion of the image based on the second background parameter.

16. The method of claim 15, wherein the first background parameter comprises intensity levels, and wherein the act of determining the first background parameter from the data of the first section of the first portion further comprises:

determining intensity levels of the data of the first section, and generating a histogram of the intensity levels.

17. The method of claim 16, wherein stretching the data corresponding to the first portion based on the first background parameter further comprises:

determining a maximum value of the intensity levels compared against a threshold; and proportionally adjusting the second set of intensity levels based on the maximum value.

18. The method of claim 15, wherein the second background parameter comprises intensity levels, and wherein the act of determining the second background parameter from the data of the second section of the first portion further comprises:

determining the intensity levels of the data of the second section, and generating a second histogram of the intensity levels.

19. The method of claim 18, wherein stretching the data corresponding to the second portion based on the second background parameter further comprises:

determining a maximum value of the intensity levels compared against a threshold; and proportionally adjusting the second set of intensity levels based on the maximum value.

20. The method of claim 15, wherein the acts of stretching data corresponding to the first portion based on the first background parameter and determining the second background parameter from the data of the second section of the first portion further comprise the acts of simultaneously stretching the data corresponding to the first portion based on the first background parameter and determining the second background parameter from the data of the second section of the first portion.

* * * * *

UNITED STATES PATENT AND TRADEMARK OFFICE
CERTIFICATE OF CORRECTION

PATENT NO. : 7,616,348 B2  Page 1 of 1
APPLICATION NO. : 11/317610
DATED : November 10, 2009
INVENTOR(S) : Mohamed Nooman Ahmed It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Nineteenth Day of October, 2010

David J. Kappos
*Director of the United States Patent and Trademark Office*